Figure 1:
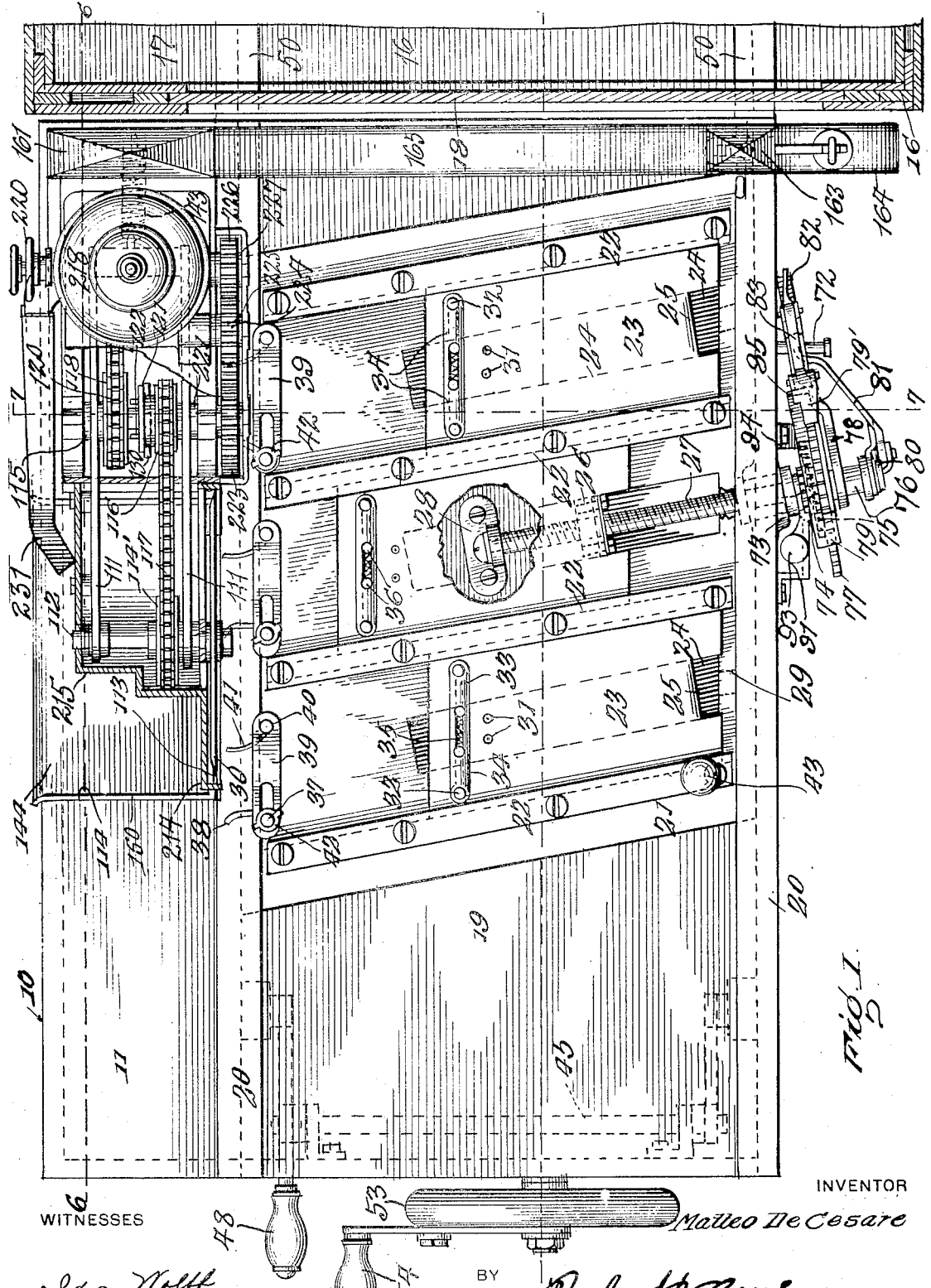

M. DE CESARE.
SANITARY AUTOMATIC SLICING MACHINE, COFFEE GRINDER, AND SCALE.
APPLICATION FILED MAY 11, 1918.

1,324,801.

Patented Dec. 16, 1919.
8 SHEETS—SHEET 3.

INVENTOR
Matteo De Cesare

WITNESSES
Ida Wolff.
John E. Burch.

BY
Richard B. Owen.
ATTORNEY

M. DE CESARE.
SANITARY AUTOMATIC SLICING MACHINE, COFFEE GRINDER, AND SCALE.
APPLICATION FILED MAY 11, 1918.

1,324,801.

Patented Dec. 16, 1919.
8 SHEETS—SHEET 4.

M. DE CESARE.
SANITARY AUTOMATIC SLICING MACHINE, COFFEE GRINDER, AND SCALE.
APPLICATION FILED MAY 11, 1918.

1,324,801.

Patented Dec. 16, 1919.
8 SHEETS—SHEET 5.

M. DE CESARE.
SANITARY AUTOMATIC SLICING MACHINE, COFFEE GRINDER, AND SCALE.
APPLICATION FILED MAY 11, 1918.

1,324,801.

Patented Dec. 16, 1919.
8 SHEETS—SHEET 7.

INVENTOR
Matteo De Cesare

WITNESSES
Ida Wolff
John F. Busch

BY Richard B. Owen.
ATTORNEY

M. DE CESARE.
SANITARY AUTOMATIC SLICING MACHINE, COFFEE GRINDER, AND SCALE.
APPLICATION FILED MAY 11, 1918.

1,324,801. Patented Dec. 16, 1919.
8 SHEETS—SHEET 8.

UNITED STATES PATENT OFFICE.

MATTEO DE CESARE, OF CLIFTON, NEW JERSEY, ASSIGNOR, BY DIRECT AND MESNE ASSIGNMENTS, OF ONE-FOURTH TO ERNEST BOCCHINO, OF PASSAIC, NEW JERSEY, AND ONE-HALF TO HYMAN ROSENSOHN AND MILTON LOWY, BOTH OF ESSEX COUNTY, NEW JERSEY.

SANITARY AUTOMATIC SLICING-MACHINE, COFFEE-GRINDER, AND SCALE.

1,324,801.     Specification of Letters Patent.     Patented Dec. 16, 1919.

Application filed May 11, 1918. Serial No. 233,929.

*To all whom it may concern:*

Be it known that I, MATTEO DE CESARE, a subject of the King of Italy, residing at Clifton, in the county of Passaic and State of New Jersey, have invented certain new and useful Improvements in Sanitary Automatic Slicing-Machines, Coffee-Grinders, and Scales, of which the following is a specification.

This invention has special reference to store service apparatus, and more particularly to meat slicers and the like.

A special object of the invention is to provide an improved machine for store service, such as for instance, in dispensing bologna, cheese, cooked ham, smoked beef, and the like, and also for the purpose of grinding coffee or other grains and for weighing the same and automatically stopping the slicing or grinding operation when a predetermined quantity or measure has been sliced or ground and discharged into the scale pan.

A further object of the invention is to provide a machine of the above character, which can be connected up or placed adjacent to an ice-box, so that different foods to be sliced as hereinbefore specified, may be conveniently moved into position for slicing the same, or disposed within the ice-box to retain the same in a clean, sanitary and fresh condition, unexposed to contamination by dirt, foreign matter, flies and other insects, as is at present the case, the device also being adapted to be operated either by hand or by motive power, as shall be found most desirable or preferable.

A still further object of the invention is to provide an improved machine for slicing various articles of food as hereinbefore set forth, and operated by hand or by motor as specified, said machine including a rotatable cutter blade or disk adapted for oscillatory movement during its rotation to efficiently sever the food in slices as the same is automatically fed forward toward the cutter blade or disk simultaneously with the rotation of the latter, so that the slices shall be of substantially uniform thickness or gage so that the operator can determine the approximate number of slices for making up a specified weight.

A still further object of the invention is to provide in conjunction with the rotatable knife or cutter blade, a slidable platform upon which various foods to be sliced are disposed or placed and adapted to be positioned for coöperation with the feeding mechanism to move the food carried thereby into position to be sliced, said platform or tray being designed to be covered to protect the food positioned thereon, or to be moved into an ice-box as desired.

A further object of the invention is to provide novel means for disengaging the platform to permit sliding of a board or tray carried thereby to shift the desired food to be cut into operative position, with facility, to provide means for firmly and accurately clamping the food in position and holding the same as the food is moved forwardly to be cut; to provide a novel operating mechanism for the cutter and means, including a scale pan for receiving the food cut and the grain which is ground, or the material prepared for use or consumption, in order that the cutting or grinding mechanism will be thrown out of operation at the required time whereby the proper quantity of food will be dispensed.

A still further and important object of the invention is to provide novel means for causing coöperation of the cutting or grinding and scale mechanism or for setting the same into operative position when released as above specified, upon the discharge of a predetermined quantity or weight of food severed, ground or treated; to provide means automatically operative upon the stopping of the cutting mechanism to prevent further feeding of the material cut or ground, said scale mechanism which is coöperative with the cutting or grinding mechanism, including novel releasing means adapted to throw out of operation instantly upon the required food being cut or ground, the cutting or grinding mechanism, either of which is operative without effecting the operation of the other.

A still further object is to provide a scale device to indicate the quantity or weight of the material deposited on the scale pan which will obviate the possibility of the improper quantity of food being deposited upon the scale pan and also indicate the exact weight, preferably in pounds and ounces or other suitable measurement of the material cut providing the slices or material as ground shall exceed or fall below a particular weight or quantity of material desired.

With the above objects and others in view, as will appear as the description proceeds, the invention comprises the various novel features of construction and arrangement of parts which will be more fully described hereinafter and set forth with particularity in the claims appended hereto.

Figure 2:
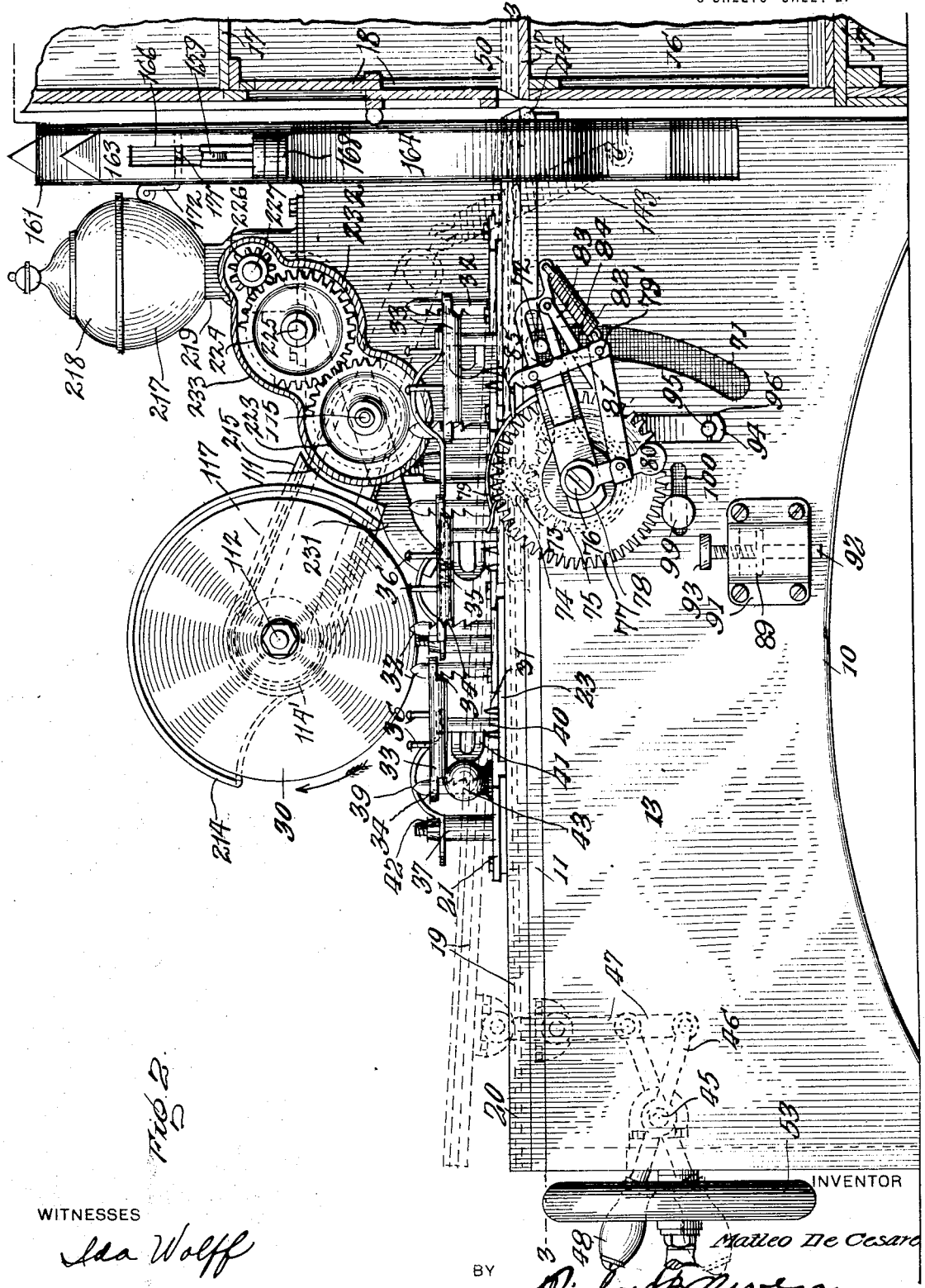
Figure 3:
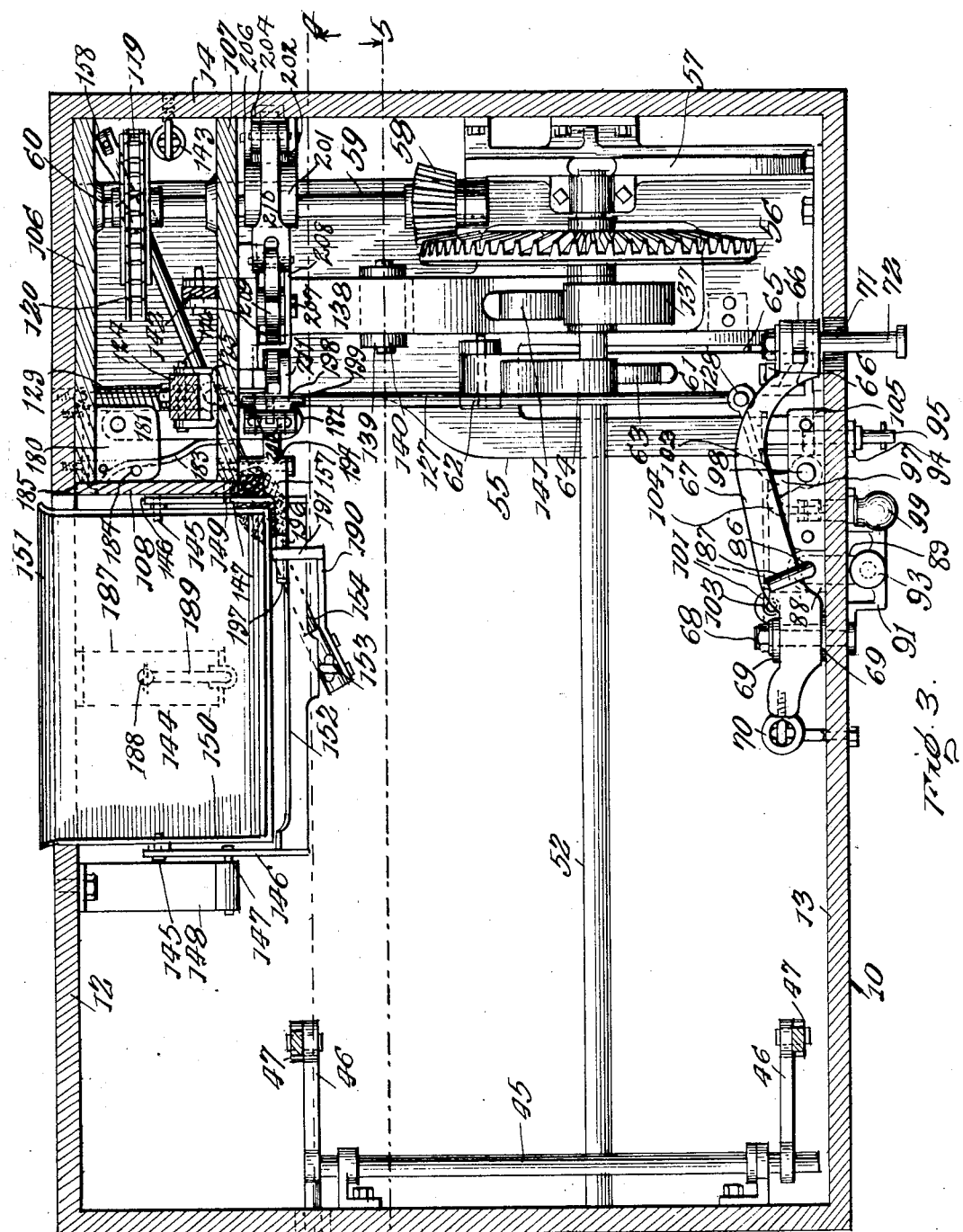

Reference is had to the accompanying drawings forming a part of this application, in which like characters indicate the corresponding parts throughout the several views and wherein, Figure 1 is a plan view of my improved store service machine, partly in section and partly broken away, Fig. 2 is a side view thereof, partly in section, Fig. 3 is a horizontal sectional view taken on the line 3—3 of Fig. 2 and looking downwardly as indicated by the arrows.

Figure 4:
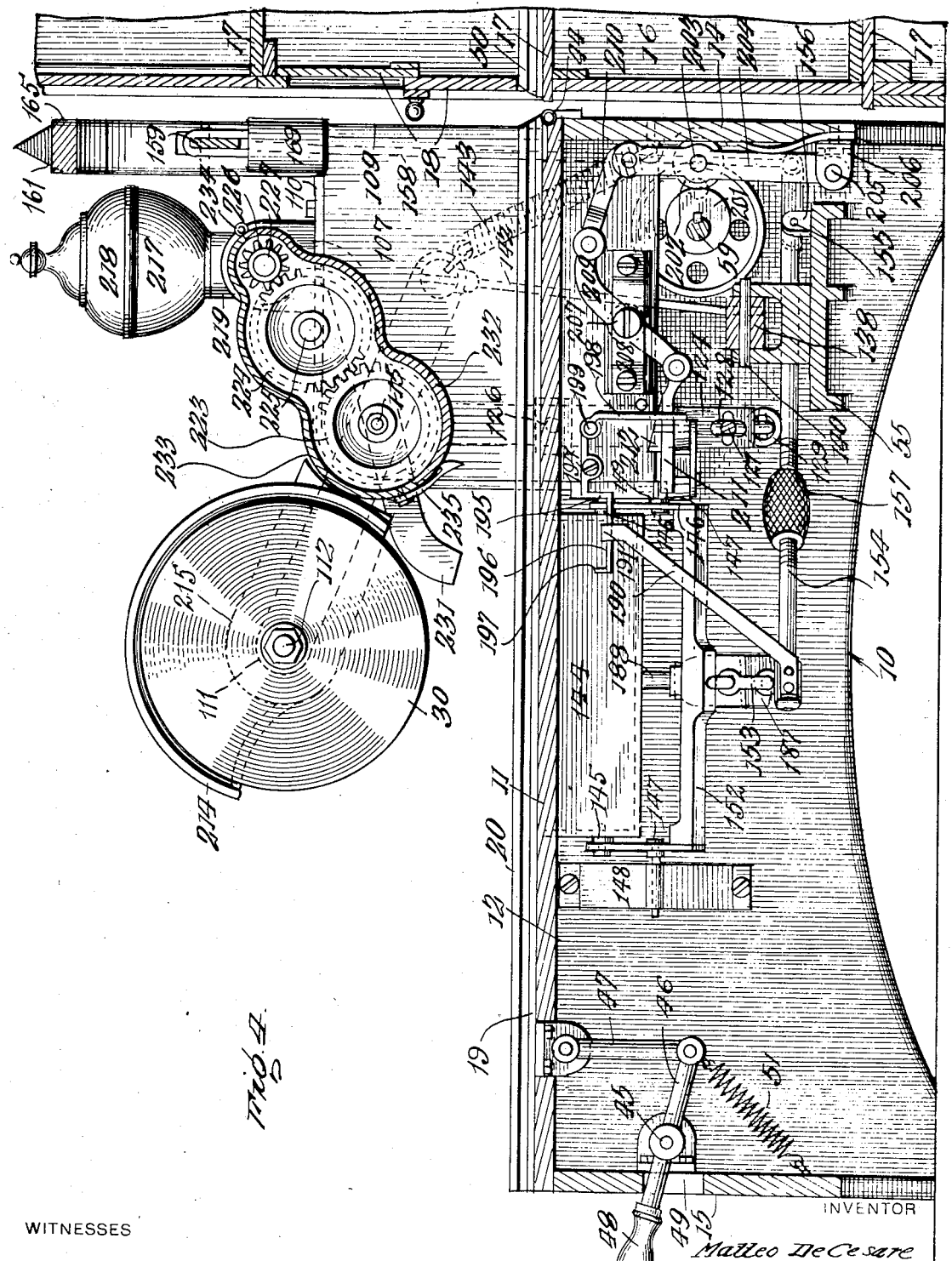
Figure 5:
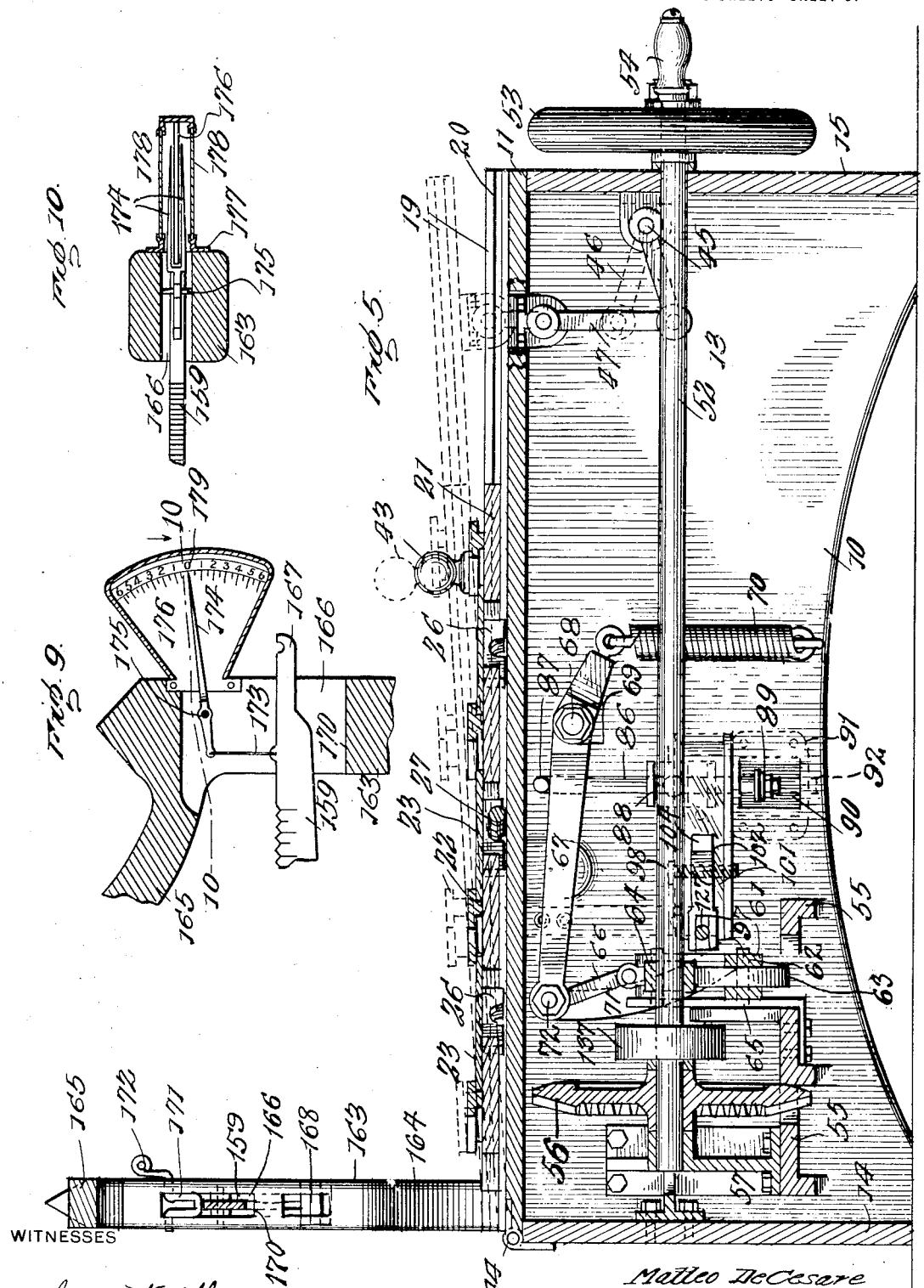
Figure 6:
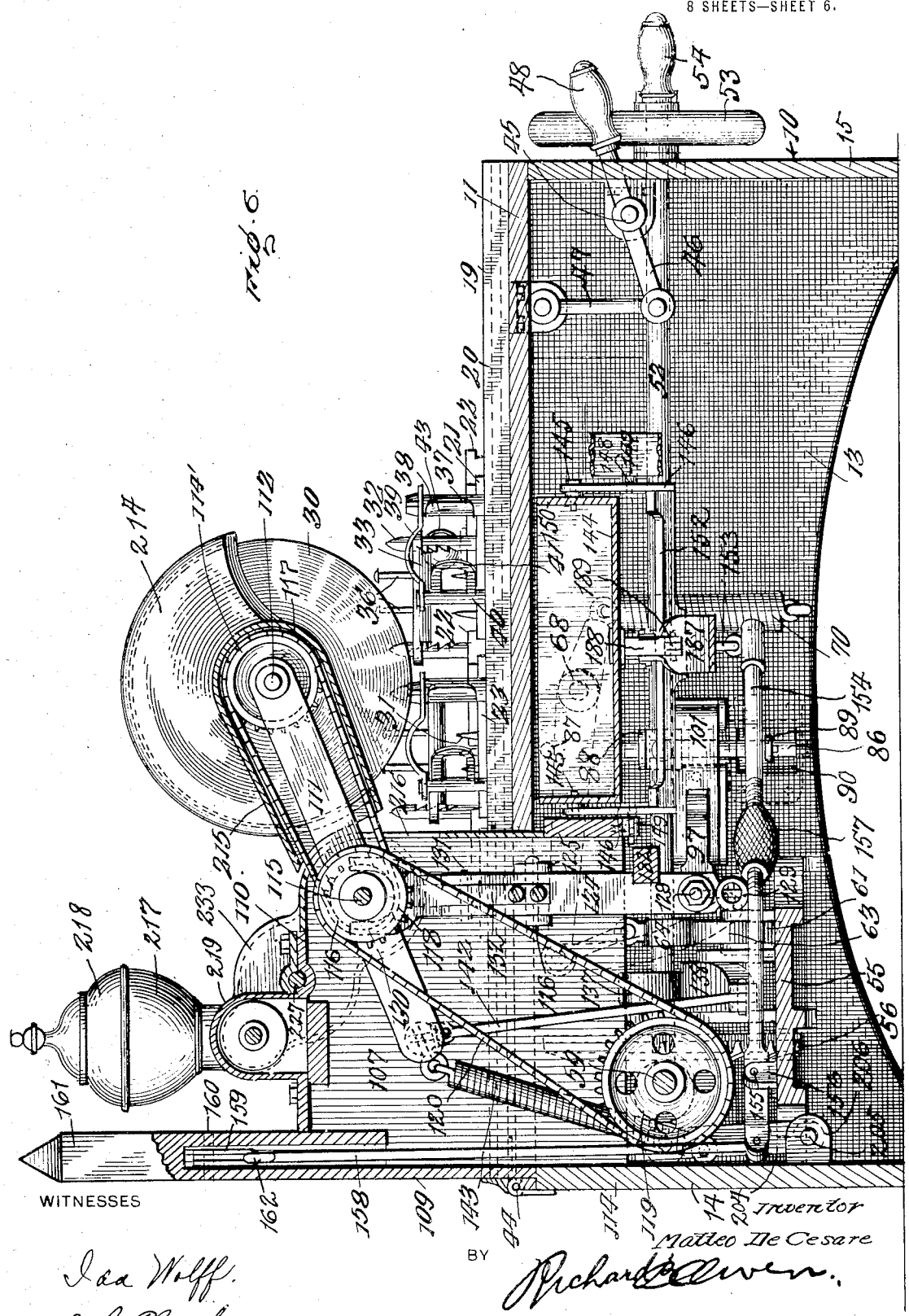
Figure 7:
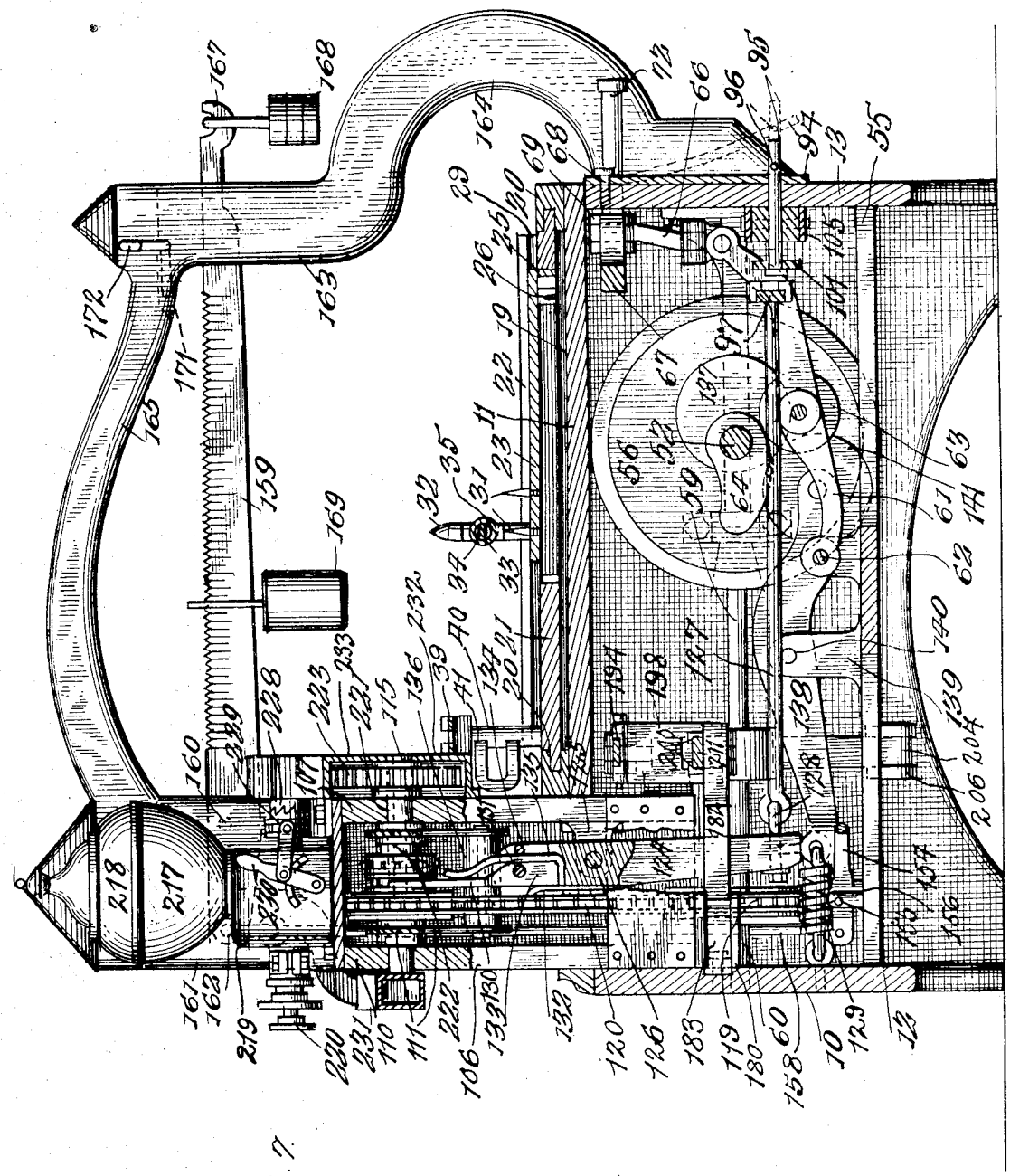
Figure 8:
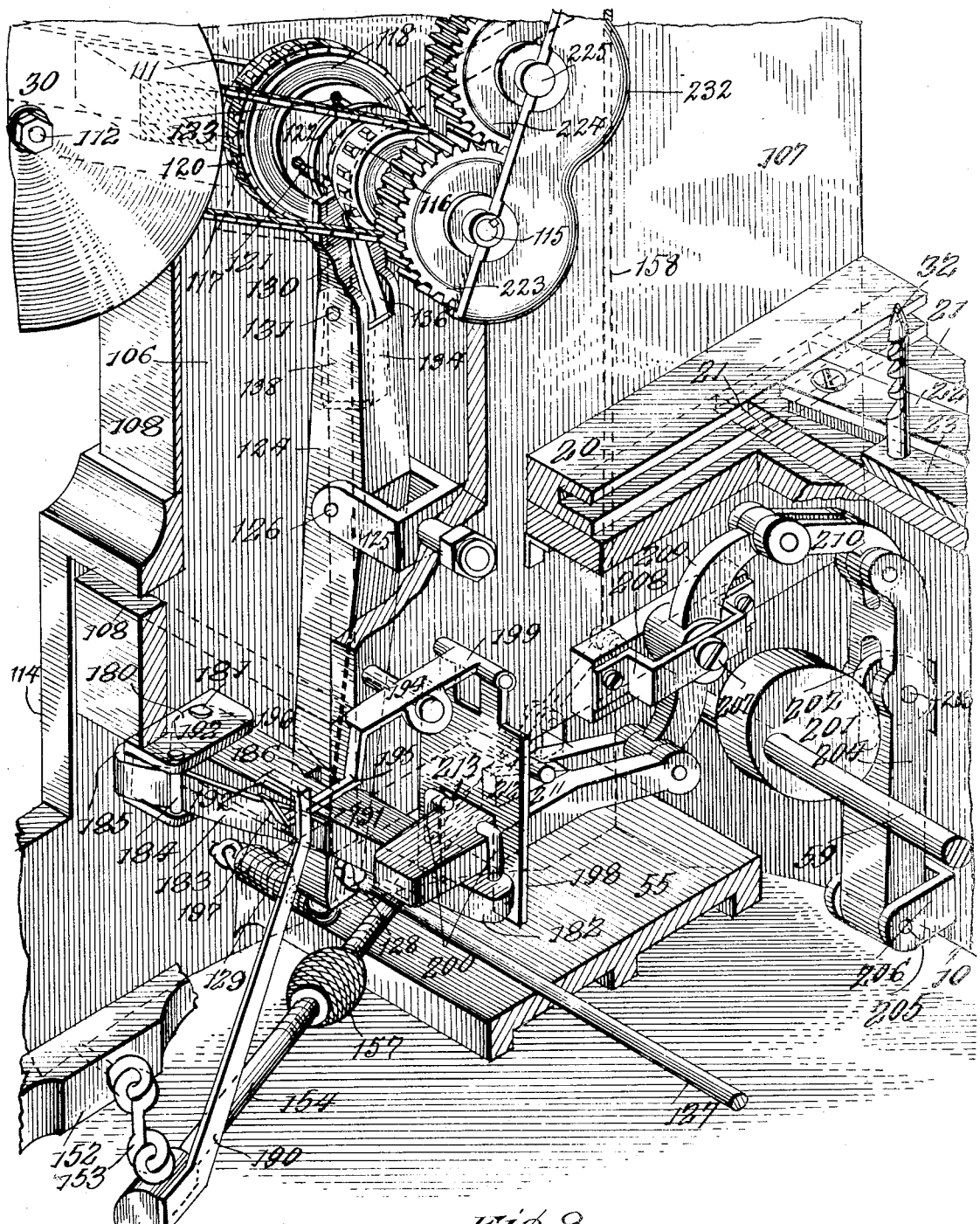

Fig. 4 is a vertical longitudinal sectional view taken on the line 4—4 of Fig. 3, Fig. 5 is a vertical longitudinal sectional view taken on the line 5—5 of Fig. 3, Fig. 6 is a vertical longitudinal sectional view taken on the line 6—6 of Fig. 1, Fig. 7 is a transverse sectional view taken on the line 7—7 of Fig. 1, Fig. 8 is an enlarged fragmentary perspective view of the interior operating mechanism and the clutch mechanism, employed for throwing the cutting and grinding mechanisms into and out of operation, Fig. 9 is a detail vertical sectional view of the scale mechanism, and Fig. 10 is a horizontal sectional view taken on the line 10—10 of Fig. 9.

Referring to the drawings in detail, the improved device is shown as comprising a casing 10 preferably of rectangular contour having a top 11, sides 12 and 13 and ends or end walls 14 and 15, the bottom of the casing being open or closed as desired without departing from the spirit of the invention. The casing is adapted to be supported on and secured to a suitable support, table or platform, which as shown may be positioned adjacent to an ice-box 16, which latter may be divided into a series of compartments through the medium of shelves 17, one of which is positioned on the same horizontal plane as the top of the casing 10 for a purpose to be hereinafter more fully and specifically set forth and described. The compartment corresponding in elevation to the top of the casing, is provided with suitable sliding doors or closures 18 by means of which access may be had to said compartment, in a manner to be further explained.

Mounted upon the top of the casing 10 is a plate 19 forming a platform and guideway in conjunction with a pair of opposed and spaced longitudinal guides or guide strips 20, which latter are formed with or secured to said plate at the opposite longitudinal edges thereof, so that one of said strips will be disposed adjacent to the side wall 13 and the other of said strips disposed parallel thereto at a spaced distance from the opposite side wall 12. Mounted for sliding movement upon the plate 19 and within the guides 20 is a platform 21, the same preferably extending diagonally or having its ends parallel and extending diagonally of the casing and platform for coöperation with the feeding mechanism as will be hereinafter more fully explained. Mounted transversely of the platform 21 and parallel to each other and the ends of the platform in equi-distantly spaced relation, are a plurality of guide strips 22. Slidable between the opposed pairs of guide strips 22 are carrier plates 23 designed to accommodate the food to be sliced and below each of which is a slot 24 so as to accommodate depending portions 25 equipped with half-nuts 26 designed to engage at times, a feed screw 27 journaled at its inner end as shown at 28 on the top of the casing, and projecting from the side wall 13 in a plane below the guideways 20 and the plate 19 mounted on the top of the casing. The platform 21 is provided with a recess 29 in its under side adjacent to each slot 24 for accommodating the feed screw 27 when either of said carrier plates 23 is moved in position over the feed screw to cause engagement of the half-nut thereof with the feed screw, whereby when the feed screw is rotated in engagement with the threads of the half-nut, the carrier plate positioned thereover will be moved forward to present the food to be cut in the path of the cutting knife 30.

Each of the carrier plates is provided with a series of upwardly projecting pins 31 designed to pierce the food placed thereon to be sliced, so as to hold the food in position and to further carry out this object, there is also positioned at the inner end of each carrier plate and adjacent to the guideways or guide strips 22 uprights 32 having notched inner faces with the upper walls of the notches horizontally positioned to restrict upward movement of a cross-piece or jaw 33 perforated near its ends to receive the uprights and provided with oppositely sliding bolts 34 to engage the notches of the uprights normally held by expansible springs 35 positioned between said bolts and within the cross-pieces or jaws as shown. The bolts are adapted to be retracted and drawn from the notches to permit upward movement of a cross-piece, through the medium of finger pieces 36 projecting upwardly from the inner ends of the bolts, while in clamping the meat, cheese or other food upon the carrier plates, the cross-pieces are forced downwardly so that the bolts ride onto the beveled faces of the notches and are held against upward movement by the horizontal faces disposed at substantially right angles to the lengths of the uprights.

Disposed at the inner end of the platform 21 between each pair of guideways or guide strips 22 is an additional clamping member comprising a post 37 on which a jaw 38 is pivoted, while engaged on the post above the sleeve portion of the jaw is a slotted and arched plate 39 carrying at its opposite end a post 40 having a resilient or spring jaw 41 coöperating with the jaw 38. A nut 42 is threaded on the upper end of the post 37 so as to clamp the plate 39 in adjusted position through the medium of the slot therein and also to hold the jaw 38 in clamping engagement with the projecting end of the food positioned in the path of the cutting blade or disk 30. In order to slide the platform 21 in the guideways 20, a handle 43 is provided and in order to permit this movement of the platform, the plate 19 is hinged at 44 to the top of the casing adjacent the end wall 14 so as to permit said plate to be elevated whereby to disengage the half-nut disposed in engagement with the feed screw, from the latter, as it is thought will be apparent. To accomplish this elevation, a U-shaped or crank shaft 45 is pivoted on the inner face of the end wall 15 in a horizontal position and the crank arms 46 thereof have links 47 connected thereto and projecting through the top of the casing for connection with the adjacent end of the plate, A handle 48 rigid with the shaft 45 projects through an opening 49 in the adjacent wall 15 and by depressing this handle, the plate 19 is elevated on its hinged connection so as to disengage the feeding device for the food, thereby permitting the platform to be shifted in the guideways thereof so as to present the desired food in position to be sliced, or for shifting the same onto the horizontally alined shelf 17 of the ice-box or refrigerator, through the medium of the tracks or guideways 50. In this manner the food will be thoroughly protected from contamination and will be kept clean, fresh and sanitary, although if desired the food may be covered in any suitable way upon the platform. A spring 51 is designed to hold the plate 19 firmly in contact with the top of the casing, and as shown it is connected to the inner end of the crank arm 46 adjacent to the lever or handle 48 and the adjacent wall of the casing.

The above described mechanism constitutes the means for supporting the food to be sliced and moving the same into the path of the cutter and in order to operate the feed screw 27 to cause its rotation for moving the carrier plate operatively engaged therewith forward, a suitably driven shaft 52 is journaled longitudinally in the casing and is provided with a fly wheel 53 to steady the operation of the machine through the instrumentality of a crank handle 54, although I wish to have it understood that instead of driving the machine by hand, it may be driven by a motor or otherwise, and suitably controlled. Disposed transversely of the casing near the end wall 14 is a bearing plate 55 and at the adjacent end of the shaft 52 is mounted a relatively large beveled gear or pinion 56, the adjacent end of the shaft being journaled in a bearing bracket 57 supported by the adjacent portions of the walls 13 and 14. The gear 56 meshes with a smaller beveled gear or pinion 58 fixed to the adjacent end of a transverse shaft 59 also journaled at said end in the bearing bracket 57 and in a bearing 60 carried by the side wall 12. Pivoted upon the bearing plate 55 is a lever 61 as shown at 62 and carrying an anti-friction roller 63 for engagement by a cam finger 64 fixed to the shaft 52, while the free end of the lever 61 which is pivoted at or near the transverse center of the casing, is curved upwardly and operates against a vertical guide 65 carried by the bearing plate. This end of the lever 61 is pivotally connected by a link 66 with an arcuate lever 67 pivoted for vertical movement on a horizontal pivot 68 in a bearing 69 carried by the side wall 13, the long arm of the lever being connected to the lever 61 and the short arm thereof being connected to a contractile spring 70 at one end of the latter near the top of the casing, while the lower end of the spring is anchored to the adjacent side wall so as to exert downward stress to normally elevate the long arm of the lever 67 and the lever 61 so as to hold the anti-friction roller 63 in contact at all times with the cam finger 64.

Adjacent to the long arm of the lever 67 at its free extremity, the side wall 13 is provided with an arcuate slot 71 and said lever carries an outwardly projecting pin 72, for a purpose to be hereinafter more fully set forth. The feed screw 27 is also journaled in a bearing 73 mounted on the wall 13, and at its outer end said screw carries a pinion 74 in mesh with a pinion 75 rotatable on a shaft 76 also journaled in the bearing 73. Also rotatable on the shaft 76 is a large ratchet pinion 77, the same being also fixed to the pinion 75 to turn therewith for the purpose of imparting rotation to the feed screw 27, when the ratchet pinion or wheel 77 is rotated as will be hereinafter set forth. Also rotatable on the shaft 76 is a slotted arm 78 having fixed for movement therewith, a spring pawl 79, the same being in the form of an arm rotatable on the shaft 76 and engaged by the arm 78 and having a peripheral extension positioned adjacent to the teeth of the ratchet wheel 77. The slotted arm 78 receives the projecting end of the pin 72, while pivotally mounted on the arm 78 is an angular latch 79' which is slotted to straddle said arm 78 and is pivotally connected at its lower end to an operating handle 80 also pivoted on the shaft 76, through the medium of a connection 81. A spring 82 is connected to the lower end of the latch 79' and anchored to the free end of the arm 78, said spring exerting strain on the long arm of the latch 79' so as to normally hold the short or engaging end thereof into engagement with the teeth of the wheel 77. Pivoted to the slotted arm 78 is a detent 83, the same having a notch 84 for engagement by the lower edge wall of the slot in the latch 79' when the detent normally drops by gravity and the latch is shifted against the action of the tension spring 82 to disengage the latch from the teeth of the ratchet wheel through the medium of the handle 80. It should be noted from the plan view that the latch 79' at its engaging end is provided with an offset 85 which overlies the spring pawl 79 and when the latch 79' is engaged by the detent, said latch is disengaged from the teeth of the ratchet wheel and the offset portion 85 is spaced from the pawl so that the ratchet wheel is free to rotate to the right in Fig. 2 of the drawings, or in a clockwise direction, while it is held from rotation to the left or in an anti-clockwise direction, for a purpose to be hereinafter more clearly set forth.

In order to limit the upward movement of the lever 67, there is slidably mounted on the inner face of the wall 13 vertically thereof, a bar 86 having an inwardly extended upper end 87 overlying the long arm of the lever 67, said bar being slidable in a bearing 88 and having at its lower end, an outwardly directed extension 89 operating through a slot 90 in the wall 13. Adjustably carried at the side of the wall 13 is a guide bearing 91 in which a depending portion 92 of the extension 89 operates and a set screw 93 is adjustable through the upper end of the guide bearing 91 so as to regulate and limit the upward movement of the bar 86 and thus limit the upward movement of the lever 67 and the operating mechanism coöperating with the slot 71 and the operating means for the feed screw 27. Secured to the outer face of the wall 13 at its upper end, is a vertical spring plate 94 and attached to the lower end thereof for sliding movement is a pin 95, said pin being held from inward displacement and the plate being held from outward displacement by a key 96. Pivotally mounted on the inner face of the wall 13 is a bell crank lever 97, the pivot 98 thereof being removable and vertically adjustable, while the outer end of the lever 97 has an operating head 99 movable through a slot 100 in the wall 13 so as to permit it to be manipulated and swung on its pivot to set the machine to operating position. Also pivoted on the inner side of the wall 13 is a rod 101, the same being slotted as shown at 102 to accommodate the lever 97 while permitting movements of the rod on its pivot 103. The free end of the rod has sliding connection with the inner end of the pin 95 so that when the bell crank lever is moved on its pivot at right angles to the plane of the wall 13, its inner arm will be drawn outwardly to the wall 13 and the portion 104 projecting inwardly from the outwardly extending arm, will act as a cam to move the rod 101 inwardly spaced from its outwardly limiting member produced by the bearing 105 of the lever 97.

As before stated, the upward movement of the lever 67 is limited by the bar 86 due to the engagement of the lever with the bar at its upper end 87 and by operating the set screw 93, the amount of movement allowed for the bar in an upward direction, can be effectually regulated so as to vary the swing of the long arm of the lever 67, thereby to regulate the swing of the pin 72 in the slot 71 so as to vary the amount of rotation imparted to the feed screw by the mechanism including the ratchet wheel heretofore set forth. By this means, the thickness of the slices cut can be effectually regulated, depending upon the thickness desired and also the material which is being cut. The rod 101, can be described as being resiliently held outwardly against the bearing 105, the same being spring pressed outwardly through the medium of the spring or spring plate 94. The purpose of this construction, aside from the setting of the mechanism through the instrumentality of the operating head of the lever 97, is to control the operation of the feed screw and to cause stopping of the feeding mechanism when the operation of the cutter is brought to a stop, as will be further explained, but at this time it may be stated that while the pin 95 is inwardly disposed by swinging the bell crank lever and setting the same at right angles to the wall 13 the detent 83 will pass the pin without striking it, thereby permitting the detent to retain the latch 79' out of engagement with the ratchet wheel so that the spring pawl 79 will engage the ratchet wheel to cause rotation thereof as the parts oscillate in connection with the oscillating crank pin 72 of the lever 67. However, as soon as the bell crank lever is released from its locked position at right angles to the wall 13, the inner arm will swing inwardly and the camming portion 104 will move outwardly with the outer arm provided with the operating head 99 and the spring pressed rod 101 will move against the bearing 105 and thus permit outward movement of the pin or trip 95 under the action of the spring 94, thus presenting the pin or trip in the path of the detent and causing the raising of the same on its pivot to disengage the latch 79' which through the medium of the spring 82, is normally brought into engagement with the teeth of the ratchet wheel, so that continued oscillation of the lever 67 and the parts associated therewith through the medium of the crank pin 72, exteriorly of the casing and including the ratchet mechanism heretofore described, will simply impart oscillation to the ratchet wheel backward and forward, without causing step by step rotation of the same and consequently the feed screw which is driven thereby. By this means, the food will not be fed forward, but will remain stationary and the cutting operation will cease.

At the opposite side of the machine adjacent to the wall 12, the cutting mechanism operates and at this side, the scale mechanism, as well as the grinding mechanism and means for throwing the same into and out of operation in conjunction with the mechanism just described, are located. The cutting knife or disk 30 has already been referred to and the casing 10 at the corner formed by the intersection of the walls 12 and 14, is provided with a vertical extension including spaced side walls 106 and 107 and end walls 108 and 109 forming an elongated rectangular inclosure having a top wall 110. Pivoted between the walls 106 and 107 is a rocker beam or lever 111, the same being pivoted intermediate its ends but nearer to its inner end, while journaled in the outer end thereof is a shaft 112 to which the circular cutter blade 30 is fixed, so that the cutter blade or disk will rotate in a vertical plane adjacent to the edge of the guide strip 20 disposed adjacent thereto and a cutting bed or strip 113 disposed adjacent to the inner edge of a cut-out or recess 114 in the casing and communicating with the adjacent side.

Also fixed to the shaft 112, though not removably in the particular manner employed in connection with the cutting blade or disk, is a pulley or sprocket wheel 114' and the shaft 115 which pivotally supports the rocker beam or lever 111 has slidably mounted thereon, a sprocket wheel or pulley 116, around which and the sprocket wheel 114' an endless chain or belt 117 is engaged. Fixed to the shaft 115 is a sprocket wheel or pulley 118, around which and a sprocket wheel or pulley 119 fixed to the shaft 59, an endless chain or belt 120 is engaged, so that when rotation is imparted to the shaft 59 by turning the shaft 52 by hand or motor in the manner previously described, rotation will be imparted to the respective drive or gear connections for rotating the sprocket or drive element 118. As the sprocket wheel 116 is rotatable on the shaft 115, and adapted to slide or translate on the shaft, said sprocket wheels 117 and 118 are provided with coacting clutch mechanism by means of which rotation can be imparted to the sprocket wheel 116 and consequently to the sprocket wheel 114 through the chain 117 and rotation thereby imparted to the cutter blade or disk for the purpose of cutting the food as the latter is fed forward in the path of the cutter blade, in the manner previously described. For this purpose, the sprocket wheel 116 is provided with a grooved clutch sleeve 121 provided with axially projecting clutch teeth or pins 122, while the adjacent face of the sprocket wheel 118 is provided with coöperating clutch recesses or sockets 123 adapted to be engaged by the teeth or pins 122 when the sprocket wheel 116 and its integrally formed or attached clutch sleeves are shifted longitudinally on the shaft 115 to transmit rotation for the purposes set forth.

In order to shift the movable clutch member in the manner specified, a vertical clutch lever 124 is pivoted horizontally in a bearing 125 carried by the wall 107 of the upwardly projecting portion or extension of the casing, said lever being adapted for lateral movement on the pivot 126 intermediate of the ends of the lever, while the lever projects downwardly and has its lower and longer arm connected to the inner arm of the bell crank lever 97 by a rod 127 as shown at 128. A retractile spring or other resilient means serves to normally draw the lower end of the lever 124 outwardly, such means being in the form of a retractile spring 129, as illustrated in the drawings, and having its opposite ends connected to the lower end of the lever 124 and to the side wall 12 of the casing respectively, thereby normally holding the clutch members disengaged, by moving the upper end of the lever, that is the upper arm thereof, inwardly to disengage the pins from their respective sockets. The upper arm of the lever 124 is provided with a fork 130 adapted to span the groove portion of the clutch sleeve for sliding the sleeve in the manner mentioned, while permitting rotation thereof with the shaft and sprocket wheel when the parts are driven to impart rotation to the cutting knife as heretofore explained. In order to prevent injury to the clutch members and permit the engagement thereof resiliently so as to reduce shock for the purpose stated, the fork portion 130 is pivoted at 131 in a recess in the upper end of the lever 124, the portion of the fork below the pivot being accommodated for movement within the recess, as is clearly shown in Figs. 7 and 8 of the drawings. A spring 132 is fixed to the lever on its outer face and engages the lower end of the fork below its pivot, so as to hold the fork in alinement with the lever and to hold said lower end portion 133 against the inner wall or abutment 134 and the anchored end 135 of a spring 136, which extends upwardly and exerts outward pressure against the fork above the pivot 131 thereof, thus coöperating with the spring 132 and tending to normally hold the clutch member engaged, while permitting resilient separation thereof to prevent mutilation of the engaging parts as well as to retain the fork member as near as possible, at right angles to the axis of the shaft on which the slidable clutch member is mounted.

In order to impart vertical swinging movement to the rocker beam or lever 111, a cam or eccentric 137 is fixed to the shaft 52 and engages during the rotation of the shaft, the inner end of a horizontally pivoted rocker lever 138 mounted in a bearing 139 arranged upon the bearing plate or support 55, said rocker lever being pivoted intermediate its ends as shown at 140 and rotatably carrying at its inner end, an anti-friction roller 141 for contact by the cam 137, which latter cam is in the form of a cylinder eccentrically fixed to the shaft 52 whereby during the rotation of said shaft and the cam carried thereby, the inner end of the rocker lever 138 will be forced downwardly beneath the bearing plate or support 55, thus swinging the outer arm or extremity thereof upwardly. The outer end of the rocker lever 138 is connected to the above end of the rocker beam or lever 111 by a pitman 142, the rocker beam or lever 111 simulating a walking beam of a vertical type of steam engine, by which the necessary oscillation of the cutter blade or disk is accomplished, during the rotation thereof for slicing the food, as has already been explained. Resilient means are also provided to normally elevate the knife while holding the opposite end of the lever downwardly, and as illustrated, this means comprises a retractile spring 143, connected to the end of the rocker beam disposed within the extension of the casing and to the adjacent end wall 14 of the casing or a suitable member anchored thereto. The purpose of this spring is to assist in the oscillation of the knife and to help raise the same owing to its weight, in connection with the drive means just described.

The weighing or scale mechanism which indicates the weight of the material cut or ground and also serves to automatically cause the inoperation of the cutting or grinding mechanism, includes a scale pan 144 positioned in the cut-out or opening 114 and pivotally suspended at 145 at the outer extremities of levers 146 pivotally supported intermediate their ends as shown at 147, in bearings 148 and 149 at the opposite ends of the scale pan, which latter is provided with a surrounding flange portion 150 projecting upwardly from the inner and end portions thereof while the outer portion thereof is directed downwardly to permit convenient removal of the material therefrom, as shown at 151. The end portions of the scale pan serve to receive the pivotal connections 145 which are movable with the scale pan upwardly and downwardly in a substantially oscillating motion on the levers 146, which are connected at their inner ends by a cross member or yoke portion 152, forming with the levers, a substantially U-shaped member or scale cradle having flexible connections as shown at 153, centrally of the ends of the portion 152 or intermediate the ends of the bight portion, with the adjacent end of a weighted scale bar 154 positioned horizontally and diagonally within the casing and pivoted upon a horizontal pivot 155 carried by a bearing 156 positioned upon the bearing plate or support 55. The pivot 155 is disposed near the end of the weighted scale bar 154 opposite the end which is pivotally connected to the scale pan cradle or U-shaped member previously described so as to provide a short arm extending to the corner of the casing, while the long arm is provided with an adjustable weight 157 by which the actuation of the scale can be regulated and the bar normally weighted downwardly, thereby imparting corresponding movement to the scale pan cradle or U-shaped member and thus to the scale pan, imparting upward movement at the outer ends of the levers 146. Obviously, in lieu of the weight 157 which is adjustable longitudinally of the scale bar 154, any suitable means may be employed for exerting downward strain upon said bar. At the outer extremity of the short arm of the lever or weighted bar 154, said bar is connected by a vertical rod 158 with the adjacent end of a scale beam 159 pivoted as shown at 160 in a hollow upright 161 projecting above the extension at the adjacent corner of the casing, for accommodating the clutch mechanism and driving means for the knife and grinder as has already been described, and as will be described further hereinafter. The pivot 160 is horizontally positioned and the pivotal connection of the rod 158 with the short arm of the graduated scale beam 159, is indicated at 162, the scale beam extending transversely of the end of the casing opposite the end at which the operating wheel or motor is positioned and corresponding to the end at which the plate 19 is hinged as at 44. At the opposite side of the casing, an upright 163 is provided, said upright having an offset portion 164 designed to permit elevation of the plate 19 as previously described, and as is clearly shown in Figs. 2 and 5 of the drawings, when disengaging the feeding mechanism for sliding the platform longitudinally upon the plate to present the food desired to be cut, in an operative position. A bridge piece 165 connects the uprights 161 and 163 and the graduated and notched scale beam 159 projects through an opening 166 in the upright 163 and is provided at its free end with a recess forming a hook portion 167 designed to take a weight 168 for measuring the amount of material which should be cut before the cutting mechanism is thrown out of operation or the required amount of material which is to be ground before the grinding mechanism is thrown out of operation. The weight 168 might be used to designate pounds and the scale bar 159 may be graduated to designate ounces which may be regulated by an adjustable weight 169 supported or suspended from and movable along the graduated scale beam, as is clearly shown in Fig. 7 of the drawings. The scale beam 159 is limited in its downward movement by engagement with the bottom edge wall 170 of the opening 166 through the upright 163 and the scale beam may be held from movement when desired, as for instance in transportation, by means of a hand operated crank member 171 pivoted transversely of the upright 163 through the opening 166 near the top of the latter and provided with a crank portion or handle 172 by which it may be swung downwardly to limit the upward movement of the scale beam, or upwardly to permit free balancing of the scale beam in the weighing operation.

Suitable means may also be provided to accommodate additional weights to be used in connection with the weight 168, as desired, and while I have described the specific construction of the scale mechanism shown in the illustration, as well as the other details of construction which I now consider it to be the best embodiments thereof, I desire to have it understood that the device is shown as merely illustrative, and that any further mechanisms comprehended within the scope of the device as claimed, may be employed and used or combined in the use, applications, and operations of the device as explained. Furthermore, in an addition to measuring the required quantity of material before the scale pan is depressed to operate the clutch mechanism for throwing the cutting or grinding mechanism out of operation, in a manner as will be hereinafter more clearly set forth and described, means may be provided for indicating overweight or underweight of material. One form of such mechanism is shown in Figs. 9 and 10 of the drawings, in which embodiment, the scale beam 159 is pivotally connected at 173 with a pointer 174 pivoted intermediately of its ends and preferably nearer its inner end as shown at 175 between the side walls of the upright produced by the opening 166. The pointer 174 is in the form of a fork or U-shaped member having its shank portion pivoted as described and its inner or shorter arm connected to the scale bar by the connecting rod 173, the pointer 174 operating on opposite sides of a segmental scale plate 176 preferably inclosed by a casing 177 having opposed transparent plates 178 of glass or the like, through which the position of the pointer may be made visible or viewed by the storeman or clerk, as well as the customer or purchaser, especially where suitable means of illuminating the scale plate and pointer, may be provided. When too much material is cut or ground, the scale beam 159 will be swung upwardly above the balancing point or center and the pointers will be swung downwardly to indicate in ounces below the zero point 179, the weight in ounces or otherwise, which is in excess of the desired weight. If the scale beam is not moved upwardly the required distance to balance, the pointers will be moved above the zero point and thereby indicate in ounces or otherwise, the weight which there is less than the weight desired to be dispensed. By this means, an accurate accounting may be had with the customer, although for all general purposes the amount of material desired can be ground or cut with such accuracy as to avoid any possibility of error or dispute and at any rate, the exact cost of the quantity of the commodity sold, can be ascertained in an instant and the transaction closed.

The mechanism for throwing the cutting or slicing mechanism, or the grinding mechanism out of operation when the required weight of material has been discharged upon the scale pan, and for causing the operation of the cutting or grinding mechanism by the setting of the clutch as heretofore set forth, will now be explained. As previously stated, the lever 124 is pivoted on the horizontally arranged pivot 126 for shifting the movable member of the clutch associated with the drive mechanism and the face of the lever toward the scale pan is straight, the horizontal cross section of the lever being preferably square, as is clearly shown in Figs. 3 and 8 of the drawing. On the adjacent side wall 12 of the casing is mounted a bearing 180 having spaced upper and lower portions receiving a vertical pivot 181 on which is pivoted for horizontal movement, an arm 182. This arm is normally spring pressed by a spring or resilient member 183 acting against the edge of the arm opposed to the lever 124, said spring being disposed behind a pin or abutment 184 carried by the bearing 180 and anchored at its inner end as shown at 185 so as to exert pressure against the arm to force the same toward the lever 124. This arm 182 is provided with a notch or recess 186 in the edge adjacent to the lever 124 and thereby constitutes a locking member to hold the lever in a fixed position with the lower arm swung inwardly and the upper arm swung outwardly to dispose the clutch in operative position with the members thereof locked together or engaged, when the device is set by depressing the bell crank lever, to draw on the rod 127, against the action of the coil spring 128. In setting the device in this manner, the lever 124 is swung inwardly in contact with the locking arm 182 until the lever 124 at its lower portion is received within the notch or recess 186 corresponding in cross section to the lever, when the lever will be held from movement while the cutting mechanism operates through the driving of the knife or disk, upon rotation being imparted to the shaft 52 in any desired manner.

Arranged beneath the scale pan 144 and supported by the side wall is an arm 187 and depending from the center of the scale pan is a standard 188 having pivotal connection with the extremity of the arm 187 through a link 189, the arm being preferably resilient, so as to sustain the scale pan should the operative supporting mechanism thereof give way due to overweight or through mishap, as may possibly occur. Projecting upwardly at an acute angle from the scale bar 154, and connected or otherwise supported upon the latter near its inner end adjacent to the center of the yoke or U-shaped member 152, is an arm 190, the same having its ends bent in angular formation at obtuse angles with respect to the main portion thereof, thereby forming an angular lever and having its upper end horizontally disposed and extended outwardly as shown at 191, with the free extremity of the part 191 directed downwardly as shown at 192. Mounted upon a horizontal pivot 193 carried by the wall 107 adjacent to the wall 12 and beyond the wall 108 of the extension of the casing, which projects into the casing proper, is a cross arm 194 having at one end, a depending portion 195 with a hook formation produced by a horizontal portion 196 and an upturned extremity 197, the free extremity of the arm 190 being engaged within the hooked portion of the arm 195 and adapted for vertical movement with respect thereto, during the vertical swinging movement of the scale pan under the action of the weight of the material therein, or when released, as will be understood. The extremities of the arms will serve to prevent displacement of one with respect to the other horizontally, while the weighted scale bar 154 will normally tend to exert downward pull upon the scale pan yoke when the scale pan is normally elevated, thereby bringing the upper extremity of the arm 190 into engagement with the arm portion 195 of the intermediately pivoted cross arm or lever 194, thereby depressing the adjacent end of the arm 70 and raising a weighted plate 198 pivotally suspended from the opposite end of the arm or lever 194, as shown at 199. The plate 198 is provided with a notched lower end or bifurcated portion and is designed to drop normally by its weight which is in excess of the weight of the opposite arm of the cross arm or lever 194, and the locking arm 182 is provided with opposed guide members 200, illustrating one method of forming a guide loop or strap, for a purpose to be more fully described. Also fixed to the shaft 59, is an eccentric disk or cam 201 which engages an antifriction roller 202 rotatable as shown at 203 in an upwardly projecting arm 204 pivoted on a horizontal pivot 205 carried by a bearing 206 supported by the adjacent end wall 14 of the casing and adapted for limited vertical swinging movement thereon in contact with the eccentrically mounted disk or cam 201, at all times. Pivoted on a horizontal pivot 207 carried by a bearing 208 supported by the adjacent wall 107, is a double ended lever 209, said lever being pivotally connected with the upper end of the arm 204 by a link 210, which as shown in the drawings, straddles the adjacent end of the lever 209 and is received by the adjacent bifurcated upper end of the arm 204, to which part it is pivotally connected in the manner shown, or in any other preferred or well known way. Pivoted to the lower arm of the lever 209 is a sliding abutment or trigger 211, the latter being bifurcated to receive the adjacent end of the lever 209 and having its free inner end sliding through the guideway provided upon the locking arm 182 and upon the latter, as is more clearly shown in Fig. 8 of the drawings.

As previously mentioned, the scale bar 154 serves to hold the arm 190 downwardly, thereby depressing the adjacent end of the cross arm or lever 194 and raising the abutment plate 198 by rocking the lever 194 on its pivot and elevating the arm to which the plate 198 is connected. Arranged upon the sliding abutment or trigger 211 is a projection 212 and when the shaft 59 is rotated to impart rotation to the eccentric disk or cam 201, the arm 204 is oscillated on its pivot 205 and corresponding movement is imparted to the lever 209 through the link connection 210, thereby reciprocating the sliding abutment or trigger 211 within its guideway. During this movement the projection 212 extending upwardly from the upper face of the trigger or sliding abutment, will pass through the bifurcation 213 in the plate 198 without striking the latter and without shifting the locking arm 182. However, upon the required weight of material falling on the scale pan so as to balance the scale beam, the scale pan will be depressed or moved downwardly on its pivotal connections, thereby swinging upwardly on the scale pan yoke raising the arm 190 to permit the plate 198 to drop by gravity in front of the guide members 200 and when the abutment 211 is reciprocated further, the projection 212 will engage the plate to force it against the locking arm 182 and guide members carried thereby, thereby swinging the arm 182 on its pivot to disengage the clutch lever 124 and permit the spring 128 to throw the clutch members out of engagement or clutching position. This will result in breaking the drive connection between the shaft 59 and the shaft 112 directly between the sprocket wheels or pulleys 116 and 118 arranged upon the shaft 115 and thus the slicing operation will cease and the food thus sliced can be dispensed with assurance that the weight is correct and that possibility of error or dispute is avoided.

In order to protect the operator during the cutting operation, a shield 214 is provided upon the rocker beam or lever 111, said shield covering the upper portion of the knife which is not effective during the cutting action, and overlying the cutting edge thereof. A casing 215 is also arranged over the drive mechanism carried by the rocker beam or lever 111 outwardly of the shaft 115 which forms a pivot therefor, so as to protect the operator from injury in connection with the drive mechanism located thereat. The extension of the casing is also provided with an opening or slot 216 through which the rocker beam or lever 111 operates during its pivoting or oscillating movement, thereby moving the cutter blade or disk in a vertical path downwardly across the food to be sliced, during the rotation thereof, thereby effectively severing the food or slice during the operation of the machine, and causing the slices to fall upon the scale pan. In order to prevent operation of the stopping mechanism in the manner previously described, by the falling of the slices upon the pan, until the desired weight is obtained, the supplementary pointer mechanism or scale beam described in connection with the main scale beam or weighing mechanism is used, thereby indicating in small degrees the excess or short weight to insure against overpaying.

As illustrative of the grinding mechanism, there is shown arranged upon the casing extension containing the driving mechanism, a coffee mill, including a hopper 217 having the usual removable cover 218 through which the coffee or other material to be ground is inserted into the hopper to be operated upon by the grinding mechanism within the casing part 219, said grinding mechanism being capable of adjustment through the usual controlling means 220 so that the material will be coarse, medium ground or fine. In order to drive the grinding mechanism independently or simultaneously with the slicing or cutting mechanism, the sprocket wheel 116 and the clutch sleeve 121 fixed to and movable therewith, are rotatable upon a tubular shaft 221 loose on the shaft 115, said tubular shaft being splined or provided with longitudinal key-ways 222 adjacent the sprocket wheel 118 so that when the movable clutch member is moved into the coöperating clutch member carried by the sprocket wheel 118, rotation will be imparted to the tubular shaft to operate the slicing or cutting mechanism if desired, said cutting mechanism otherwise, being thrown out of operation. The shaft 221 is projected beyond the inner wall of the casing extension together with the shaft 115, and has fixed thereto, a pinion 223 disposed in mesh with a pinion 224 journaled on a shaft 225 upon the top of the casing extension, said pinion 224 being in turn disposed in mesh with a pinion 226 journaled on a shaft 227 of the grinding mechanism and having an integral clutch sleeve 228 adapted to coöperate with a clutch sleeve 229 splined on the shaft 227 of the grinding mechanism and capable of being shifted and held in fixed position by a throw lever 230, so as to throw the clutch members together for the purpose of imparting rotation to the grinding mechanism within the casing 219, when rotation is imparted to the shaft 115 and consequently to the tubular shaft 221, when the clutch members are engaged. If the clutch members 228 and 229 are thrown out of engagement, the grinding mechanism will not operate and when said clutch members are thrown into engagement for causing the operation of the grinding mechanism, the said slicing mechanism will be thrown out of operation automatically through the medium of the clutch mechanism previously described in connection with the slicing mechanism, upon the required weight of material being discharged onto the scale pan through the chute or spout 231 which extends from the mill downwardly to a point in close proximity to the scale pan as is clearly shown in Figs. 1 and 4 of the drawings. The gear drive mechanism is also covered to prevent injury as well as to permit lubrication and exclude dust and dirt, the covering consisting of a bottom section 232 which is stationary, while the upper section 233 is hinged to the lower section as shown at 234, a catch 235 at the free end of the section 233 serving to hold the latter in closed position by engagement with the lower section 232.

In the operation of slicing, the food to be sliced is placed upon the carrier plate and the carrier plate which is disposed into operative engagement with the feed screw 27 will carry the food which is to be cut. The food having been clamped in position in the manner and by the means heretofore described, the mechanism is set for operation by throwing in the clutch through the medium of the bell crank lever, through the instrumentality of its operating portion 99. When this is done, the locking arm 182 holds the clutch lever in operative position. The shaft 52 is then rotated so as to impart oscillation to the rocker beam or lever 111 through the operative connections, at the same time rotating the cutting disk. As the material falls upon the scale pan, the latter is depressed and when the plate 198 is released, the projection 212 will engage it while reciprocating when driven from the shaft 59 during the continued operation of the machine, and the locking arm 182 will be moved out of engagement with the clutch lever 124, thereby unclutching the respective sprocket wheels serving to impart rotation to the cutting disk. After this, it will continue to oscillate but will not rotate and the feeding mechanism will stop, owing to the fact that the ratchet mechanism will be released to prevent further rotation of the feed screw owing to the swinging of the bell crank lever and the tripping of the ratchet mechanism as heretofore explained. It is to be understood of course that the scale is set to indicate the proper weight of material to be dispensed prior to beginning the cutting operation and that the same operation is repeated for dispensing the food or material in a like manner. The operation is the same in connection with the grinding mechanism, except that the clutching operation is effected through the drive mechanism or gears for the coffee mill or grinder, including the tubular shaft mounted upon the shaft 115 which carries the clutch mechanism. Also, through the instrumentality of the clutch mechanism operated by the throw lever or handle 230, the mill or grinding mechanism may be thrown out of operation when the cutting mechanism is in operation, and vice versa.

From the foregoing description, taken in connection with the accompanying drawings, the advantages of the construction and of the method of operation will be readily apparent to those skilled in the art to which the invention appertains and while I describe the principle of operation of the invention, together with the devices which I now consider to be the best embodiments thereof, I desire to have it understood that the devices shown are merely illustrative, and that such changes may be made when desired as are within the scope of the device as claimed.

However, the operating mechanism is so timed that when the knife is being elevated, the feed screw is being rotated so as to feed the food forward for the cutting operation as the knife rotates in moving downwardly. When the knife is moving downwardly across the path of the food and the cutting operation is taking place, the feed mechanism is temporarily stopped, these operations being intermittent and alternating.

Having thus described my invention what I claim and desire to secure by Letters Patent is:—

1. In a slicing mechanism, a slicing knife, a shaft, means for driving said shaft, operative connections between the knife and said shaft, a scale mechanism including a scale beam, a trip mechanism, clutch mechanism between the drive shaft and the drive means for the knife, and means operative upon the discharge of a predetermed quantity of material to operate said trip mechanism for throwing the knife out of operation.

2. In a slicing mechanism the combination with a casing, a rotatable cutting disk, means for oscillating said disk into and out of the path of the material to be cut, a feed screw, a plate adapted to be disposed adjacent to or spaced above the feed screw, a platform movable upon the plate and adapted to support a series of foods to be cut thereon, supporting plates carried by said platform and having each a half-nut for engagement with the feed screw, said plate being adapted to be fed forward to present the material in the path of the knife during the cutting operation, driving mechanism, ratchet mechanism associated with the driving mechanism and with the feed screw for causing the operation of the latter, and means associated with the cutting mechanism for throwing said ratchet mechanism out of operation to cause inoperation of the feed screw.

3. In a slicing mechanism the combination with a casing, a rotatable cutting disk, means for oscillating said disk into and out of the path of the material to be cut, a feed screw, a plate adapted to be disposed adjacent to or above the feed screw, a platform movable upon the plate and adapted to support a series of foods to be cut thereon, supporting plates carried by said platform and having each a half-nut for engagement with the feed screw, said plate being adapted to be fed forward to present the material in the path of the knife during the cutting operation, driving mechanism, ratchet mechanism associated with the driving mechanism and with the feed screw for causing the operation of the latter, means associated with the cutting mechanism for throwing said ratchet mechanism out of operation to cause inoperation of the feed screw when a predetermined quantity of material has been sliced, said means including a scale mechanism adapted to be operated by said material for tripping the drive mechanism and the ratchet mechanism, and means for setting said ratchet mechanism to cause operation of the cutting mechanism.

4. In a slicing mechanism the combination with a casing, a rotatable cutting disk, means for oscillating said disk into and out of the path of the material to be cut, a feed screw, a plate adapted to be disposed adjacent to or above the feed screw, a platform movable upon the plate and adapted to support a series of foods to be cut thereon, supporting plates carried by said platform and having each a half-nut for engagement with the feed screw, said plate being adapted to be fed forward to present the material in the path of the knife during the cutting operation, driving mechanism, ratchet mechanism associated with the driving mechanism and with the feed screw for causing the operation of the latter, means associated with the cutting mechanism for throwing said ratchet mechanism out of operation to cause inoperation of the feed screw when a predetermined quantity of material has been sliced, said means including a scale mechanism adapted to be operated by said material for tripping the drive mechanism and the ratchet mechanism, said scale mechanism including a scale beam, means for varying the weight to be balanced thereby, a supplementary scale beam, a double faced indicator plate coöperative therewith and having upper and lower series of indications adapted by upward or downward movement of the supplementary scale beam to indicate when the weight of the material cut is above or below a predetermined quantity, and means for covering the material upon the platform.

5. In a slicing mechanism, a casing, a rotatable cutting disk, means for oscillating said disk into and out of the path of the material to be cut, a feed screw, a plate above the feed screw, a platform movable upon the plate to support a series of foods to be cut thereon, supporting plates carried by said platform, a half-nut on each plate for engagement with the feed screw, driving mechanism, ratchet mechanism associated with the driving mechanism and with the feed screw for causing the operation of the latter, means associated with the cutting mechanism for throwing said ratchet mechanism out of operation to cause inoperation of the feed screw when a predetermined quantity of material has been sliced, a scale mechanism adapted to be operated by said material for tripping the drive mechanism and the ratchet mechanism, a scale beam, means for varying the weight to be balanced thereby, a supplementary scale beam, a double faced indicator plate coöperative therewith and having upper and lower series of indications adapted by upward or downward movement of the supplementary scale beam to indicate when the weight of the material cut is above or below a predetermined quantity, guideways on the casing plate, an inclosure disposed adjacent to the casing, guideways within said inclosure in alinement with the guideways of the plate on the casing, means for elevating the plate to permit the platform to be moved into the inclosure upon the guideways thereof, and means for regulating the feeding action of the ratchet mechanism.

6. In a slicing mechanism, a casing, a rotatable cutting disk, means for oscillating said disk into and out of the path of the material to be cut, a feed screw, a plate adapted to be disposed adjacent to or above the feed screw, a platform movable upon the plate and adapted to support a series of foods to be cut thereon, supporting plates carried by said platform, a half-nut carried by each plate for engagement with the feed screw, said plate being adapted to be fed forward to present the material in the path of the knife during the cutting operation, driving mechanism, ratchet mechanism associated with the driving mechanism and with the feed screw for causing the operation of the latter, means associated with the cutting mechanism for throwing said ratchet mechanism out of operation to cause inoperation of the feed screw when a predetermined quantity of material has been sliced, a scale mechanism adapted to be operated by said material for tripping the drive mechanism and the ratchet mechanism, a scale beam, means for varying the weight to be balanced thereby, a supplementary scale beam, a double faced indicator plate coöperative therewith and having upper and lower series of indications adapted by upward or downward movement of the supplementary scale beam to indicate when the weight of the material cut is above or below a predetermined quantity, guideways on the casing plate, an inclosure disposed adjacent to the casing, guideways within said inclosure in alinement with the guideways of the plate on the casing, means for elevating the plate to permit the platform to be moved into the inclosure upon the guideways thereof.

7. In a slicing mechanism, a casing, a rotatable cutting disk, means for oscillating said disk into and out of the path of the material to be cut, a feed screw, a plate adapted to be disposed adjacent to or above the feed screw, a platform movable upon the plate and adapted to support a series of foods to be cut thereon, supporting plates carried by said platform, a half-nut on each plate for engagement with the feed screw, said plate being adapted to be fed forward to present the material in the path of the knife during the cutting operation, driving mechanism, ratchet mechanism associated with the driving mechanism and with the feed screw for causing the operation of the latter, means associated with the cutting mechanism for throwing said ratchet mechanism out of operation to cause inoperation of the feed screw when a predetermined quantity of material has been sliced, a scale mechanism adapted to be operated by said material for tripping the drive mechanism and the ratchet mechanism, a scale beam, means for varying the weight to be balanced thereby, a supplementary scale beam, a double faced indicator plate coöperative therewith and having upper and lower series of indications adapted by upward or downward movement of the supplementary scale beam to indicate when the weight of the material cut is above or below a predetermined quantity, guideways on the casing plate, an inclosure disposed adjacent to the casing, guideways within said inclosure in alinement with the guideways of the plate on the casing, means for elevating the plate to permit the platform to be moved into the inclosure upon the guideways thereof, means for resetting the clutch mechanism and ratchet mechanism manually, said clutch mechanism being automatically disengaged, and means for limiting the operation of the feeding mechanism.

8. In a slicing mechanism the combination with a casing, a rotatable cutting disk, means for oscillating said disk into and out of the path of the material to be cut, a feed screw, a plate adapted to be disposed adjacent to or spaced above the feed screw, a platform movable upon the plate and adapted to support a series of foods to be cut thereon, supporting plates carried by said platform and having each a half-nut for engagement with the feed screw, said plate being adapted to be fed forward to present the material in the path of the knife during the cutting operation, driving mechanism, ratchet mechanism associated with the driving mechanism and with the feed screw for causing the operation of the latter, and means associated with the cutting mechanism for throwing said ratchet mechanism out of operation to cause inoperation of the feed screw, said feeding operation taking place when the disk is moving out of the path of the material to be cut and said feeding mechanism being operative when the disk is operating.

In testimony whereof I affix my signature in presence of two witnesses.

MATTEO DE CESARE.

Witnesses:
HYMAN RUSSELL,
ERNEST BOSCHINO.